United States Patent [19]

Rhodes et al.

[11] Patent Number: 5,070,251
[45] Date of Patent: Dec. 3, 1991

[54] COMPUTER CONTROLLED STANDBY POWER SUPPLY SYSTEM

[75] Inventors: Bruce R. Rhodes, Inverness; Dave Bollinger, Schaumburg; Mark Dombrowski, Chicago, all of Ill.

[73] Assignee: General Signal Corporation, Stamford, Conn.

[21] Appl. No.: 529,066

[22] Filed: May 25, 1990

[51] Int. Cl.$^5$ .................................. H02M 3/335
[52] U.S. Cl. ........................... 307/46; 307/87; 363/26; 363/134
[58] Field of Search ............ 307/46, 64, 66, 80, 307/85, 86, 87; 363/24–26, 50, 133, 134

[56] References Cited

U.S. PATENT DOCUMENTS

| | | | |
|---|---|---|---|
| 3,932,764 | 1/1976 | Corey | 307/87 |
| 4,259,630 | 3/1981 | Killian | 318/807 |
| 4,337,429 | 6/1982 | Stuart | 318/811 |
| 4,447,786 | 5/1984 | Saav et al. | 318/811 |
| 4,466,052 | 8/1984 | Thrap | 363/41 |
| 4,466,070 | 8/1984 | Claussen | 364/480 |
| 4,560,886 | 12/1985 | Ferguson | 307/64 |
| 4,580,064 | 4/1986 | Varnovitsky | 307/265 |
| 4,587,605 | 5/1986 | Kouyama et al. | 363/41 |
| 4,595,976 | 6/1986 | Pavvo, II | 363/41 |
| 4,608,499 | 8/1986 | Rathmann | 307/66 |
| 4,628,438 | 12/1986 | Montague | 307/66 |
| 4,672,228 | 6/1987 | Swoboda | 307/66 |
| 4,672,293 | 6/1987 | Crampton | 320/14 |
| 4,675,583 | 6/1987 | Berghammer | 318/254 |
| 4,692,145 | 9/1987 | Weyant | 307/66 |
| 4,694,194 | 9/1987 | Hansel et al. | 307/66 |
| 4,703,191 | 10/1987 | Ferguson | 307/87 |
| 4,728,808 | 3/1988 | Ran Bet-Esh | 307/66 |
| 4,779,007 | 10/1988 | Schlanger | 307/66 |
| 4,823,019 | 4/1989 | Gronskog et al. | 307/66 |
| 4,827,150 | 5/1989 | Reynal | 307/66 |
| 4,876,460 | 10/1989 | Johnson | 307/64 |
| 4,885,521 | 12/1989 | Crampton | 320/14 |
| 4,916,329 | 4/1990 | Dang et al. | 307/87 |
| 4,954,726 | 9/1990 | Lipman et al. | 307/66 |

OTHER PUBLICATIONS

Sola Products Catalog, Catalog 718, pp. 36, 37, 38, 39.

Primary Examiner—Peter S. Wong
Attorney, Agent, or Firm—Martin Lukacher

[57] ABSTRACT

A standby power supply system (SPS) is connected to supply power to a load by way of a transfer switch, to replace power from the AC lines, when the AC line fails to provide sufficient voltage to operate the load (e.g., 85% of nominal RMS voltage usually 120 VAC-RMS). The SPS has an inverter which switches voltage from a battery to generate AC power when the line fails. The inverter is controlled by varying the width of switching pulses in order to regulate the AC output voltage and compensate for reductions in battery voltage as the battery discharges. The AC output voltage is also synchronized with the line voltage when the line voltage returns (increases to greater than 85% of nominal value) so that on switch over back to the AC line, the AC waveform applied to the load does not change substantially before and after switch over. The inverter is controlled by a computer controller (microprocessor) directly in response to current in the inverter for regulating the output voltage without the need for sensing the output voltage, thereby avoiding sensing transformers and ancillary circuits connected to the AC lines. The microprocessor also functions as a variable frequency oscillator for synchronizing the inverter AC voltage with the line AC voltage thereby preventing output waveform discontinuities upon switch over from the inverter to the AC line.

39 Claims, 9 Drawing Sheets

COMPUTER CONTROLLED STANDBY POWER SUPPLY SYSTEM

The present invention relates to a power supply system (method and apparatus) for providing AC power from a source of DC voltage, and more particularly to a power supply system which provides an AC voltage which is regulated in magnitude and in frequency.

The invention is especially suitable for use in a standby power supply system (SPS) which provides AC power to a load when an AC line, as from a public utility, fails to provide power at sufficient voltage level, to operate a load as when the AC line voltage drops below a certain threshold, usually about 85% of its nominal RMS value. The invention is also applicable for use in controlling inverters which create an AC output from a DC voltage source, usually a battery, where it is desired to provide regulation of the AC output voltage and of the AC output frequency, especially by direct computer control of the inverter.

SPS equipment, which has heretofore been available, contains a battery and an inverter to convert DC to AC corresponding to the AC voltage of the AC power lines (e.g., 120 VAC). An SPS has a transfer switch. Normally, the inverter is off, and the primary AC power from the lines passes through the switch to the load. However, when the AC voltage drops below a predetermined threshold—typically 15% below nominal voltage—the transfer switch transfers the load to the output of the inverter, which then supplies the power (e.g., 120 VAC) to the load. Since the battery voltage decreases as it discharges, the AC output voltage tends to decline. To compensate for such decline, the width of pulses generated in the inverter from which the AC voltage is obtained is increased. It is also necessary to synchronize the inverter output waveform to the AC line wave form in order to avoid transients or wave form distortion which can adversely affect the operation of the load when the load is switched back to the AC line voltage.

In order to provide these regulating functions, SPS systems have derived control signals in accordance with the difference between the desired output voltage at the inverter and a reference voltage. The error voltage is used to modulate the width of pulses which switch current from the battery to produce the AC output. Synchronization has been provided by generating the switching pulses at the frequency of the AC line. Computers have been used to carry out the regulating process by connecting them in feedback relationship with the output or load voltage sensor. Such indirect or feedback control does not make full use of the capabilities of the computer. Other disadvantages arise from the need for isolation of the control circuits from the output; a special output sense transformer being required for the purpose of obtaining such isolation. In addition, special purpose integrated circuits have been used for modulating the width of the pulses which control switching in the inverter.

It has been found in accordance with the invention that indirect control of the switching without sensing the output or load voltage is adequate to provide regulation. Moreover, it has been found that the computer may be used to bring the inverter output voltage into synchronism with the AC line when the AC line voltage returns; i.e., the line changes from a failed to an unfailed state—the failed state, for example, occurring when the line voltage is less than 15% of nominal and the unfailed state occurring when the line voltage returns to within 15% of nominal. The direct control of inverter output voltage level and of the synchronization function has the feature of providing the significant cost savings in the elimination of output voltage sensing and isolation circuits (transformers) and eliminating the need for special integrated circuits.

Accordingly, it is the principal object of the present invention to provide an improved system (method and apparatus) for changing DC voltage to AC voltage which affords regulation of the AC voltage while the DC voltage declines (for example, as a battery which provides the DC voltage discharges) and also enables synchronization of the voltage provided by the inverter with a reference AC voltage, for example, the voltage of the AC line which is replaced by the inverter output voltage when the AC line enters a failed state.

It is another object of the present invention to provide an improved standby power supply system, including an inverter which changes a DC voltage, as from a battery, into an AC voltage corresponding in value to the nominal voltage of an AC line and which uses direct computer control for voltage regulation and for synchronization purposes.

It is a further object of the present invention to provide an improved standby power supply system which provides voltage regulation and synchronization without the need for sensing the output voltage of the power supply system which is applied to a load operated by the system.

Briefly described, a system in accordance with the invention, generates from a source of DC voltage, AC power of a voltage level corresponding to the voltage from an AC line and in synchronous relationship with the voltage from the AC line so as to provide a standby source of AC power to replace the power from the line when the line enters a failed state (fails to provide power sufficient to operate a load). The system uses an inverter which inverts DC voltage to generate an AC voltage using a train of pulses. The current corresponding to the generated AC voltage is sensed. The duty cycle (pulse width) of the pulses is varied in response to the current to maintain the voltage level, for example at the nominal level of the voltage from the AC line. Also, the time of occurrence of the pulses is varied so as to provide an output which is in synchronous relationship with the AC line voltage. The means for varying the duty cycle and time of occurrence is provided by a computer, such as a microprocessor, which generates, directly, a pulse train having a periodicity corresponding to the periodicity of the AC voltage generated by the inverter. The computer also is responsive to the current through the inverter and, preferably, also to the level of the DC voltage which is switched in the inverter (battery voltage level). The computer calculates the width of the pulses which switch the DC voltage to generate the AC output of the inverter so as to regulate the output voltage. The computer also is part of a phase locked loop for controlling the periodicity (timing of occurrence) of the switching pulses—so as to bring the AC output of the inverter into synchronism with the AC line at such time when the AC line has returned to its unfailed state and provides for transfer of the load back to the AC line after sufficient time has expired to bring the inverter output into synchronism with the AC line. It will be apparent that the system provided by the invention eliminates the need for output voltage sensing and makes maximum use of the computer controller for regulation, synchronization and other control and indicating functions as may be desired, for example, shutting down the inverter if the current which is produced is to high for the ratings of the inverter components (an overcurrent condition), with a minimum of additional circuitry.

The foregoing and other objects, features and advantages of the invention, as well as a presently preferred embodiment thereof and the best mode now known for carrying out the invention will become more apparent from a reading of the following description in connection with the accompanying drawings in which:

FIGS. 3, 4 A&B, 5 and 8 A&B constitute a flow chart illustrating the programming of the computer (CPU) to carry out the functions of the system shown in FIG. 1;

Figure 1:
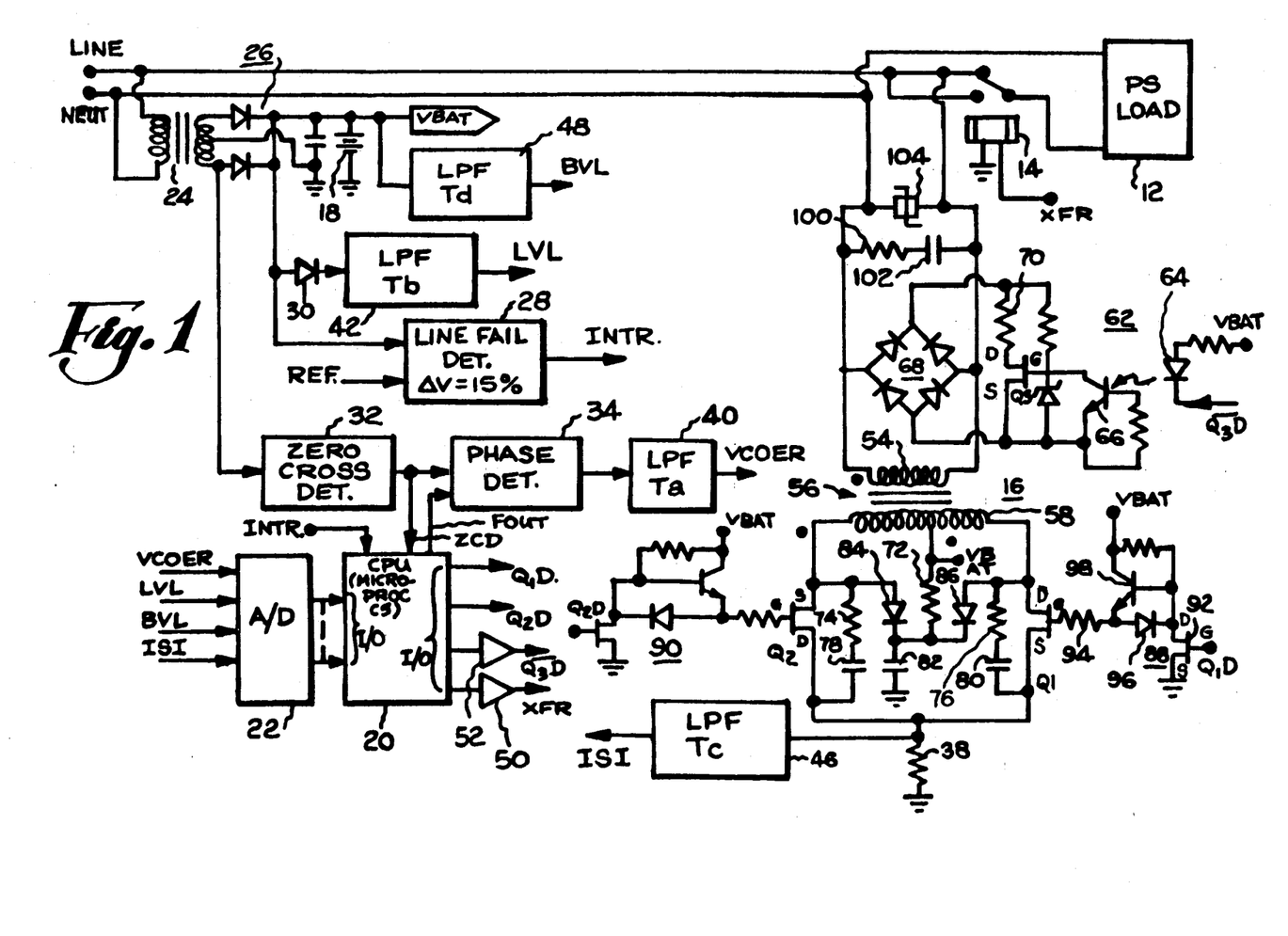
FIG. 1 is a schematic diagram of an SPS system embodying the invention.

Referring more particularly to FIG. 1, an AC line from the public utility is connected between terminals labelled LINE and NEUT of an SPS system 10. The line is connected to a load 12 which may be the power supply of a system which require continuous power, for example a computer system. The power supply load 12 may consist of conventional rectifier and filtering and regulating circuits. However, the load may be any load which requires continuous power. The line is connected through a switch provided by the contacts of a transfer relay 14. When the relay is not pulled in (energized), the load is connected, as shown, to the output of the SPS system. The output of the SPS system is the output of an inverter 16. The inverter switches current from a battery 18. The high or positive side thereof is shown as VBAT. The inverter is controlled and regulated both in the output voltage which it produces and to provide the synchronous relationship between the output voltage and the AC line by a CPU 20. The CPU itself may be of the type commercially available, for example, a chip consisting of a Motorola 6805 microprocessor chip with I/O (input/output) ports, a read only memory (ROM) which may be of the erasable type, a random access memory (RAM) and a clock oscillator. The I/O ports are shown on the CPU.

The CPU reads analog voltages through an analog to digital converter (A/D) 22 and provides output drive pulses and levels for operating the inverter and the transfer relay 14. The CPU also receives an interrupt (INTR) when the AC line fails (drops below a preset threshold suitably corresponding to 15% of the nominal RMS AC line voltage) which in the United States is 120 VAC RMS at 60 Hz. The AC line is connected through a transformer 24 to a diode rectifier and filter circuit 26 which functions as a battery charger for the battery 18. The DC voltage from the rectifier 26 is applied to a line failed detector 28 which senses when the nominal voltage drops below a reference typically corresponding to a 15% drop from 120 VAC. The line is referred to as failed or in a failed state when it drops below 85% of the nominal 120 VAC RMS value. Otherwise, it is in its unfailed state. When in the failed state, the voltage from the line is considered insufficient to operate the load 12. The detector produces INTR when the AC line enters the failed state.

The line voltage level is sensed through an isolating diode 30. The line voltage frequency and phase is sensed by a zero crossing detector 32. The output of the zero crossing detector represents the periodicity of the AC line voltage since it occurs at the zero crossings. The zero crossing detector is of conventional design and may be composed of analog or digital circuitry of the type known in the art. The output of the zero crossing detector is a pulse train with lagging and leading edges of the pulses thereof at the zero, 180° and 360° points of each cycle of the input AC wave form. This output, ZCD, is applied to a digital phase detector 34, together with an output FOUT from the CPU 20. The frequency of the output of the inverter 16 when the line is in its failed state is constant. When the line has returned, FOUT tracks ZCD. The phase detector output is an error signal representing the difference in phase between FOUT and ZCD.

Other inputs to the CPU via the A/D 22 correspond to the magnitude of the current drawn by the inverter from the battery 18. This current corresponds to the voltage across a current sense resistor 38. Since the currents are relatively high (of the order of 100 Amps) the resistor may be a high power resistor of small value (e.g., 0.0025 Ohms).

Low pass filters having different time constant(s), Ta-Td, provide the input data signals to the CPU 20 via the A/D 22. A low pass filter 40 provides the phase difference error signal VCOER. Another low pass filter 42 connected to the isolation diode 30 provides the output signal corresponding to the level of the AC line voltage, LVL. A low pass filter 46 having a time constant shorter than the duration of several cycles of the AC line voltage provides the instantaneous current output ISI. This current is sampled each time the inverter switches. The time constant of the filters may suitably be as follows: Ta=47 ms; Tb=0.267 sec; Tc=66 us; and Td=0.1 sec.

It will be noted that the low pass filter 46 with time constant Td provides the BVL output corresponding to the battery voltage.

The CPU provides inverter enabling signals Q1D and Q2D. The transfer relay is pulled in when the output XFR from the CPU goes high. This output is provided at proper level through a buffer amplifier 50. Q3D is enabled during the dwell time between pulses of the train of pulses of opposite polarity which produces the AC output of the inverter.

The inverter 16 has two field effect transistors Q1 and Q2 which operate the inverter as a push pull inverter to create an AC voltage across the secondary winding 54 of a transformer 56 by alternately switching the battery across different halves of a center tapped primary 58 of the transformer 56. When Q1 is turned on, the battery is connected across one-half of the primary 58 and a positive voltage is applied across the AC output of the inverter (connected to the side of the secondary having the dot to indicate winding sense). When Q2 is turned on, the battery is connected to the other half of the primary 58 and creates a voltage of the opposite polarity across the AC output.

Q3D is isolated from the inverter circuit by an Opto coupler 62 having an LED 64 and a photo transistor 66.

A diode bridge circuit 68 is connected across the AC output. Q3 clamps the AC output voltage to near zero when Q1 and Q2 are off. Q3D is asserted when it is low (although it is shown as a train of positive pulses Q3 drive in FIG. 2 for clarity). Then, the current flows from the battery through the LED 64 and causes FET Q3 to turn on so as to provide essentially a short circuit through the source to drain path of Q3 and a resistor 70 across the bridge 68.

A network consisting of resistors 72, 74 and 76, capacitors 78, 80 and 82 and diodes 84 and 86 limit the peak source to drain voltage across the field effect transistors Q1 and Q2 and damp switching transients.

Drive circuits 88 and 90 apply Q1D and Q2D to the gates of Q1 and Q2. These circuits are identical and operate in a similar manner. Only the drive circuit 88 is therefore described in detail. When Q1D is high, a field effect transistor 92 is turned on, which pulls the gate of Q1 to ground through a resistor 94 and a diode 96. When Q1D is low, transistor 92 is off. This turns an NPN transistor 98 on and applies positive voltage to the gate of Q1, turning Q1 on. The alternate switching on and off of Q1 and Q2 provide a train of pulses through the primary 58 of the transformer 56. These pulses are translated into a train of successive pulses of opposite polarity in the secondary 54. An RC network having a resistor 100 and capacitor 102 is connected across the secondary 54 to damp switching transients caused by the inverter switching actions. A varistor 104 is also connected across the secondary 54 (the output of the inverter) to clamp over voltages at the inverter output.

Figure 2:
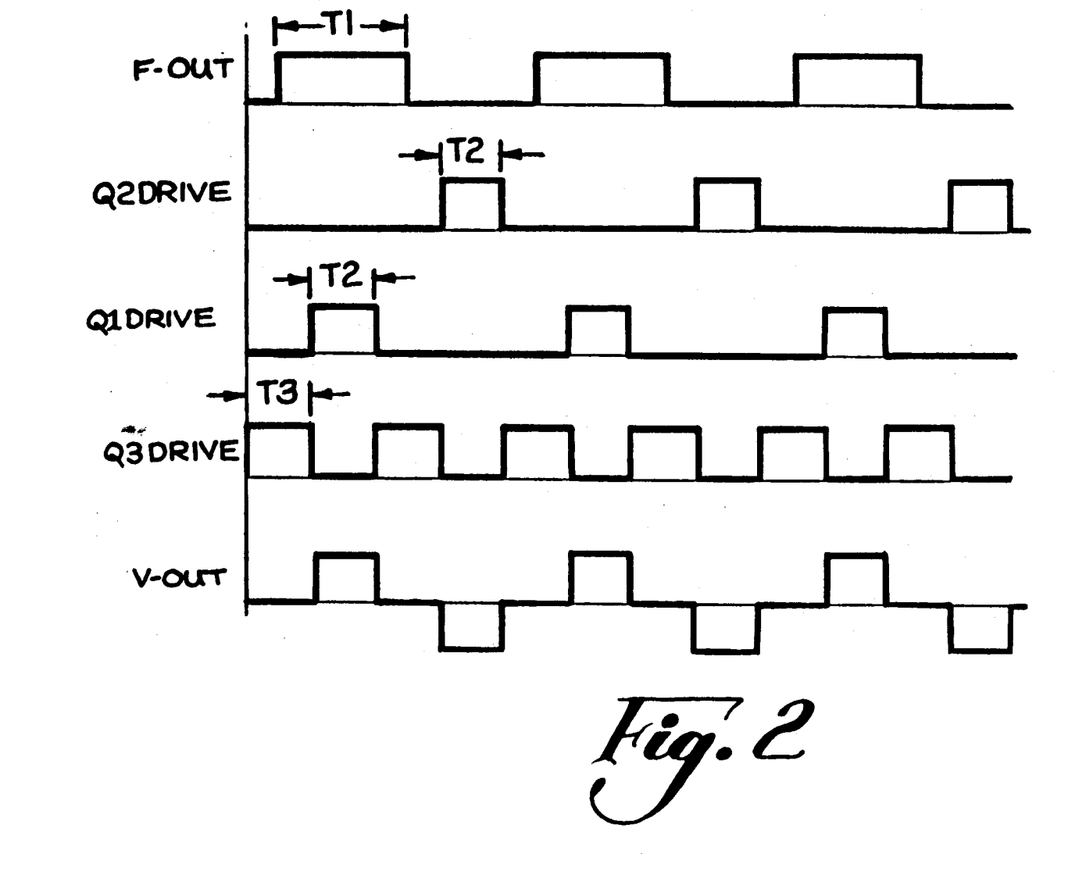
FIG. 2 are waveforms illustrating pulse trains generated in the operation of the system shown in FIG. 1.

The timing relationship between the pulse trains produced in the system 10 is shown in FIG. 2. All pulse trains are shown positive for the sake of simplicity. The microprocessor of the CPU functions as a variable frequency oscillator or VCO (voltage controlled oscillator) of a phase lock loop in producing FOUT, since FOUT changes in accordance with VCOER.

When the line is in an unfailed state, FOUT tracks the zero crossings of the AC line voltage. The FOUT pulse train has a period equal to 2T1 and consists of half period pulses (duty cycle 50%). In other words, FOUT is high for half a period and low for half a period of each cycle of the AC output voltage.

While the microprocessor 20 is generating FOUT during inverter operation, it also generates the pulse trains Q1D, Q2D and Q3D (shown in FIG. 2 as Q1DRIVE, Q2DRIVE and Q3DRIVE) to drive the switching transistors Q1 and Q2 and the transistor Q3 which clamps the output to zero during the dwell or dead time of V-OUT. The output RMS voltage is proportional to the ratio of T2 to T1 (T2/T1). The output frequency is equal to $\frac{1}{2}$T1. T1 is equal to T2 plus T3. As will be described in connection with FIGS. 4, 5 and 6, during inverter operation (when the line is in its failed state) the microprocessor controls the output voltage and frequency in response to LVL (the battery voltage level) and the inverter current.

The instantaneous inverter current ISI is measured shortly after Q1 and Q2 are turned on. If the current is higher than a predetermined value (determined by the ratings of the transistors Q1 and Q2 and other components of the system, inverter operation is stopped by the CPU which turns Q1D and Q2D high effectively connecting the gates of Q1 and Q2 to ground and shutting down inverter operation.

For the case illustrated in FIG. 2, it was assumed that the line fail signal (INTR) occurred just before the zero crossing of the AC line waveform. Then, Q3 is turned on immediately and remains on for a period of time equal to T3/2. Then, Q3 is turned off and Q1 is turned on for a period of time equal to T2. Then, Q1 is turned off and Q3 is turned on for a period of time equal to T3. This cycle repeats with Q1 and Q2 alternately turned on for times equal to T2 with Q3 turned on for a time equal to T3 between each drive pulse (Q1D and Q2D) for Q1 and Q2. This controlling action for Q1, Q2 and Q3 creates the alternating voltage at the output of the inverter that powers the load when the input line is in its failed state.

Figure 3:
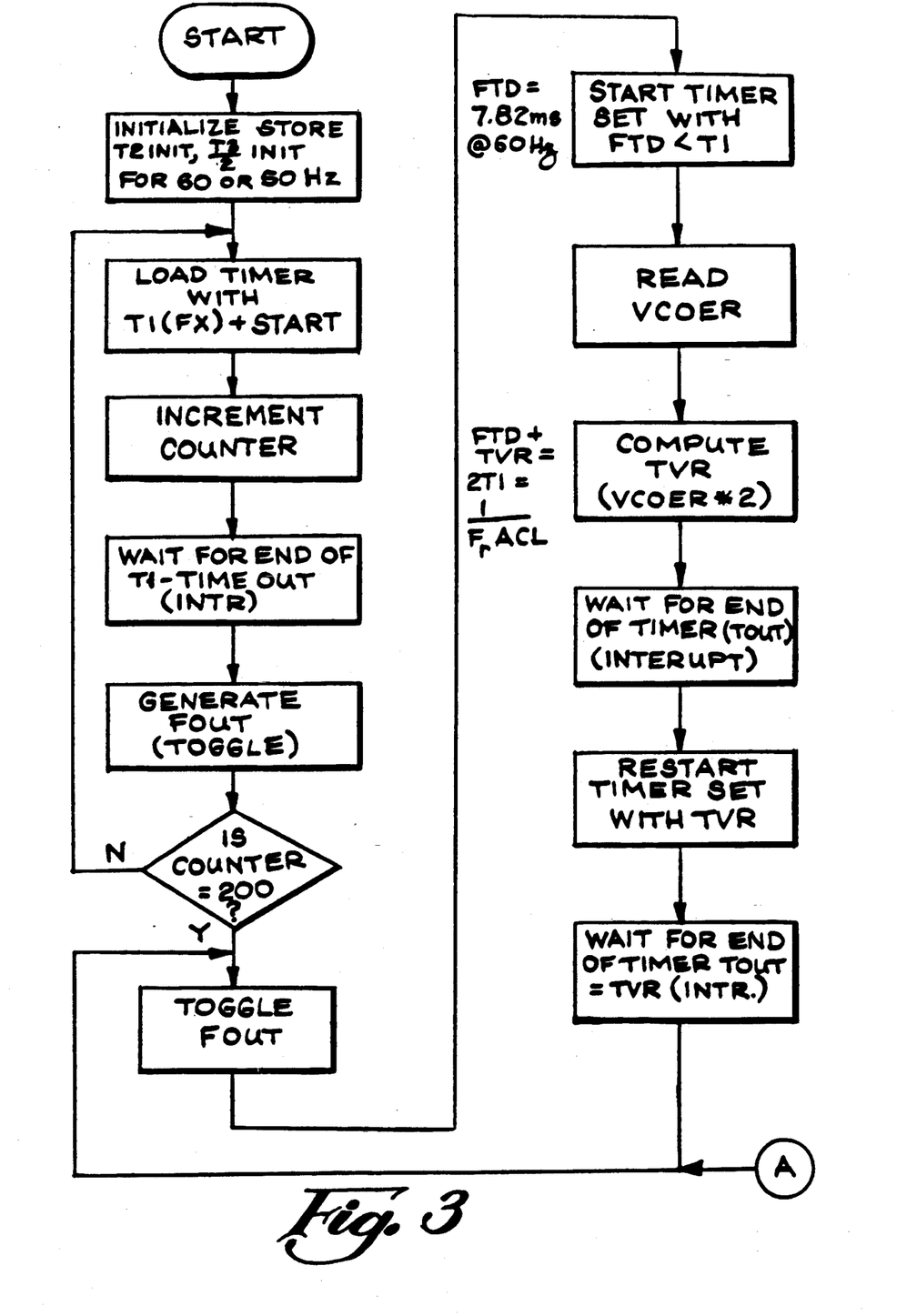
Figure 4A:
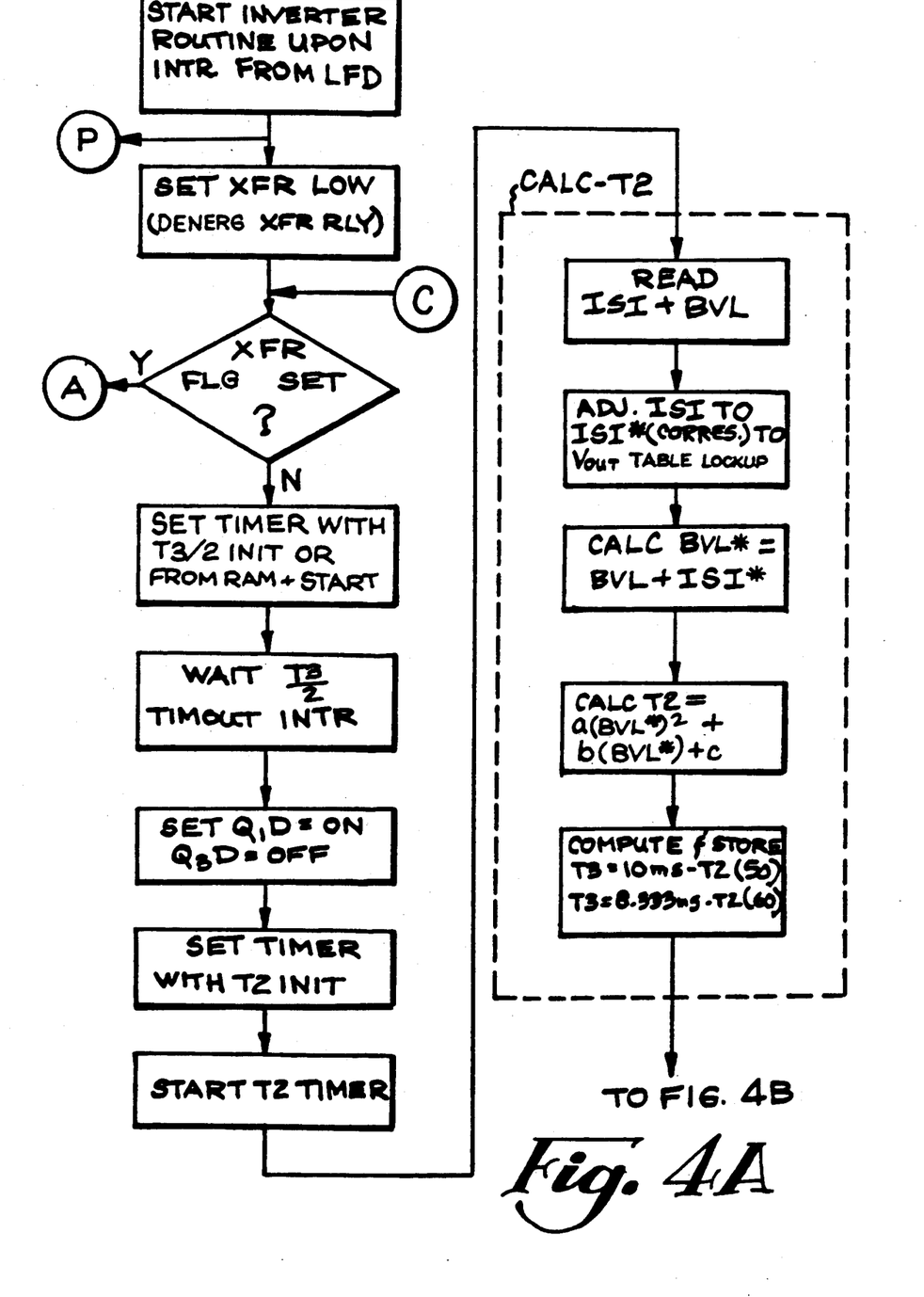
Figure 4B:
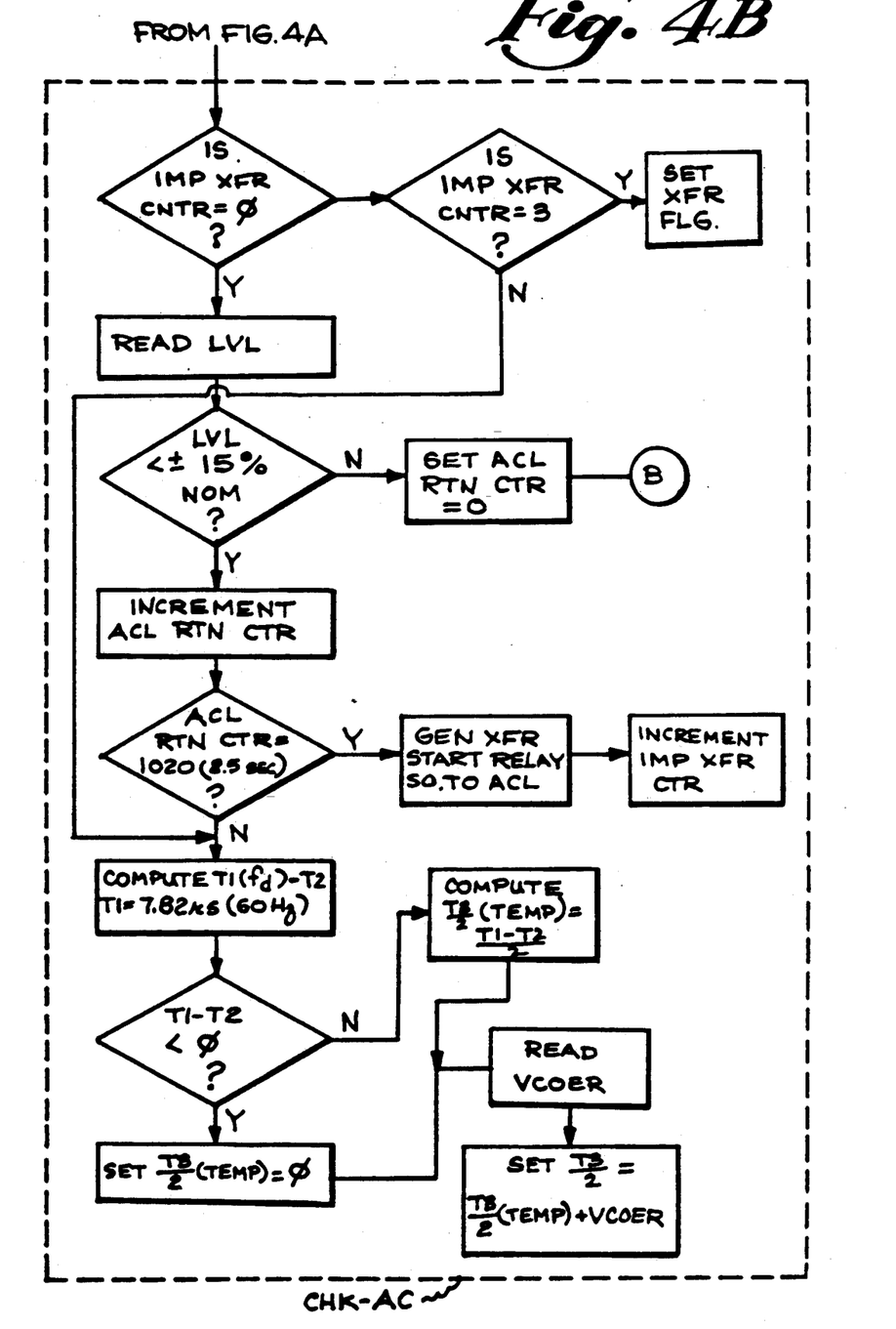
Figure 5:
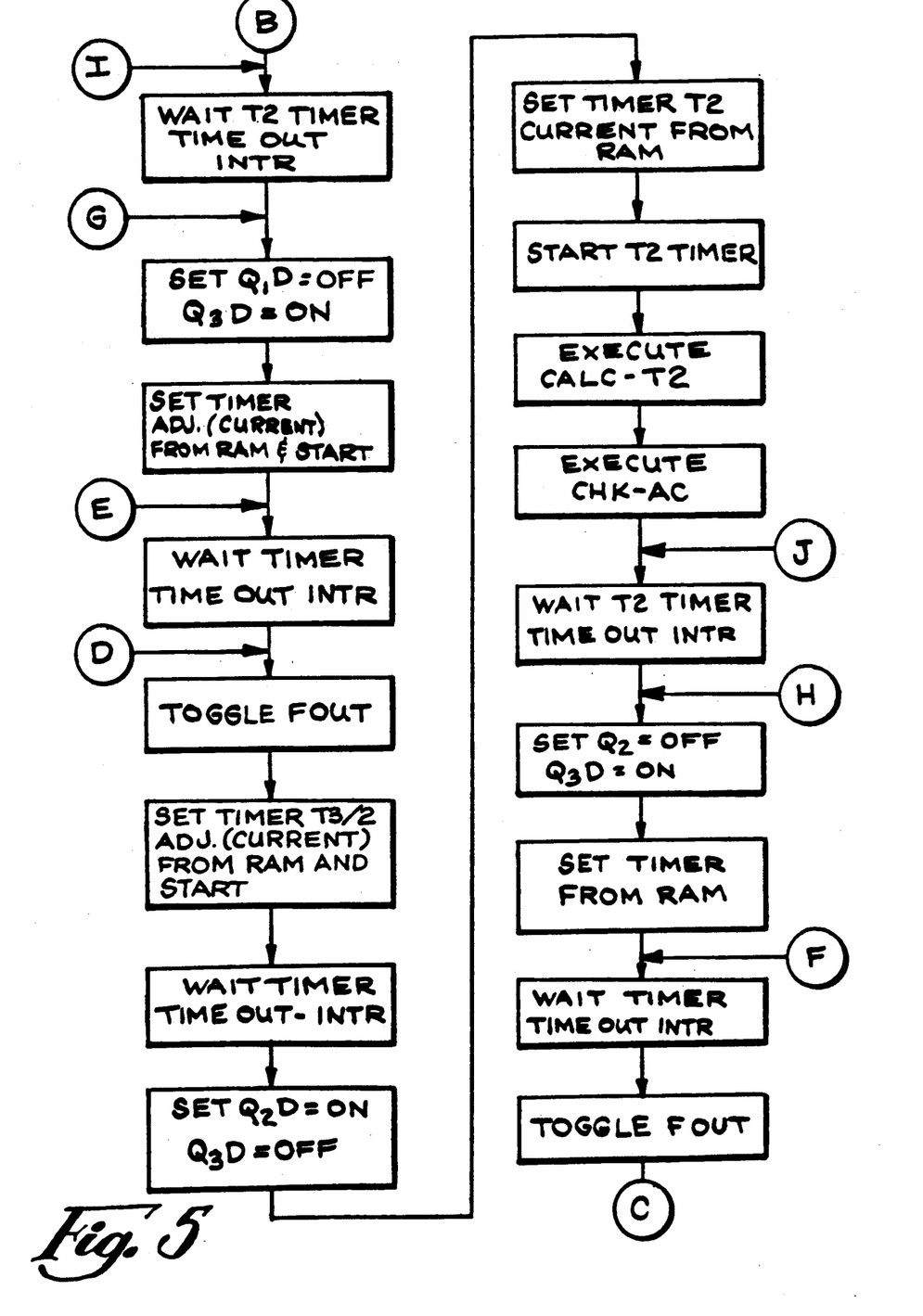

The programming of the CPU is shown in detail in connection with FIGS. 3, 4 and 5. Briefly, there are three modes of operation. First, when the line is in its unfailed state and the line is providing AC power to the load, when the line has failed and is in its failed state and the inverter is supplying AC power to the load, and when the line has returned and the inverter is being synchronized with the AC line so as to enable transfer back to the line when the inverter voltage and line voltage are synchronized with each other. During inverter operation, the pulse width T2 is increased the duty cycle of the T2 pulse trains Q1D and Q2D is made longer to keep the AC output voltage from the inverter at a constant RMS value while the battery voltage is dropping as the battery discharges. This is accomplished by the CPU reading the battery voltage BVL and the inverter current ISI and calculating new values for T2 and T3. As T2 is made longer, T3 is decreased proportionally to keep T1 constant and thus maintain the output AC frequency constant. These calculations are carried out in the CALC-T2 subroutine which is shown in detail in FIG. 4. When the line has returned and transfer from the inverter back to the line is pending, as is determined by monitoring LVL continually in the CHK-AC subroutine shown in detail in FIG. 4, T3 is adjusted in order to phase lock to the incoming line wave form. If the AC line voltage is continually within limits (greater than 15% of nominal 120 VAC) for 8.5 seconds, the transfer relay 14 is energized and actually pulls in one cycle of the AC wave form after the expiration of the 8.5 seconds. During this time (8.5 seconds plus one cycle) the inverter AC output is phase locked with the AC line wave form so as to enable transient free transfer from the inverter to the AC line. After transfer, the mode of operation where the AC line is in its unfailed state resumes with the CPU acting as a VCO and tracking the AC line wave form producing FOUT in synchronism with the cross overs of the AC line voltage. The program in effect when the AC line is present and the inverter is not operating, is shown in FIG. 3.

Referring to FIG. 3 at startup when the SPS system 10 is placed into operation and initialization process occurs, values for T2 and one-half T3 (T3/2) are stored, with different values used for 50 or 60 Hz operation. It will be appreciated that a feature of the invention is that the system can automatically operate either as a 50 or 60 Hz system merely be changing the numerical values which are stored in the memory of the CPU 20. T3/2 is stored since it is desired to switch the inverter switching transistors Q1 and Q2 in the middle of each half cycle which starts at T3/2 after the leading and trailing edges of the FOUT pulses.

Returning to the flow chart of FIG. 3, a loop is executed for 200 cycles to initialize the system. In this loop, a timer is loaded with the fixed value of (T1−FX) and started. A counter is incremented on each T1 pulse. At the time-out of the timer, which occurs at the end of each T1−FX time, FOUT is toggled. In other words, the bit of the output port which produces FOUT is switched to high if it is low and to low if it is high. When the counter reaches 200, the initialization loop is exited.

The next loop in the main program is the AC-Present routine. This loop produces FOUT, phase locked with the AC line waveform by operating the microprocessor 20 as a VCO. In this loop, FOUT is toggled. Then, a timer is set with a fixed time delay FTD which is less than T1. In the 60 Hz case, this delay may suitably be 7.82 milliseconds (ms). Then, the digital signal representing the error voltage VCOER is read. A variable time delay TVR is then computed. It has been found that this variable time delay for each half cycle of the AC line wave form is suitably the product of VCOER and 2 (VCOER*2). Then, the fixed time delay plus the variable time delay will equal a half cycle, or T1, in duration. See the equation to the left of the compute TVR process block. There $F_rACL$ means the AC line frequency. This half cycle is arrived at by waiting for the end of the timer. When the fixed time delay times out (TOUT), an interrupt is generated and the timer is restarted set with TVR. Then, at the end of that time-out (TOUT=TVR), another interrupt occurs and FOUT is toggled. Since, TVR depends upon the phase difference between ZCD and FOUT, the loop reduces this phase difference on each cycle (each execution of the loop) so as to phase lock FOUT with ZCD.

Referring to FIG. 4, when the AC line enters its failed state, an interrupt is produced by the line failed detector (LFD) 28. The transfer relay drive voltage XFR is then set low, so that the relay drops out to the position shown in FIG. 1. The microprocessor 20 then enters a loop that is executed until the AC line has returned for 8.5 seconds. The first decision is whether a transfer XFR is set. This transfer flag is set if the line has returned. Then, the program returns to the AC present routine via connectors A—A.

If this loop has just been entered, the XFR FLG is not set. First, a timer is set with T3/2. The stored initial value is used. It will be appreciated as the description proceeds that the T3/2 value is stored in RAM and is changed as the duty cycle of the AC output pulse train changes. The current value of T3/2 is always used. After the initial interrupt, only the initial value which is stored in the initialization routine is available. This value is used. After the T3/2 timer times out, an interrupt occurs. Now, Q1D is set (low in the circuit illustrated in FIG. 1) to turn Q1 on and Q3 is set (Q3D low in FIG. 1) to turn Q3 off. Now the timer is set with T2. After the first interrupt, the initial value of T2 is used. The timer is started. Sufficient time is now available to execute both the CALC-T2 and the CHK-AC routines.

Figure 6:
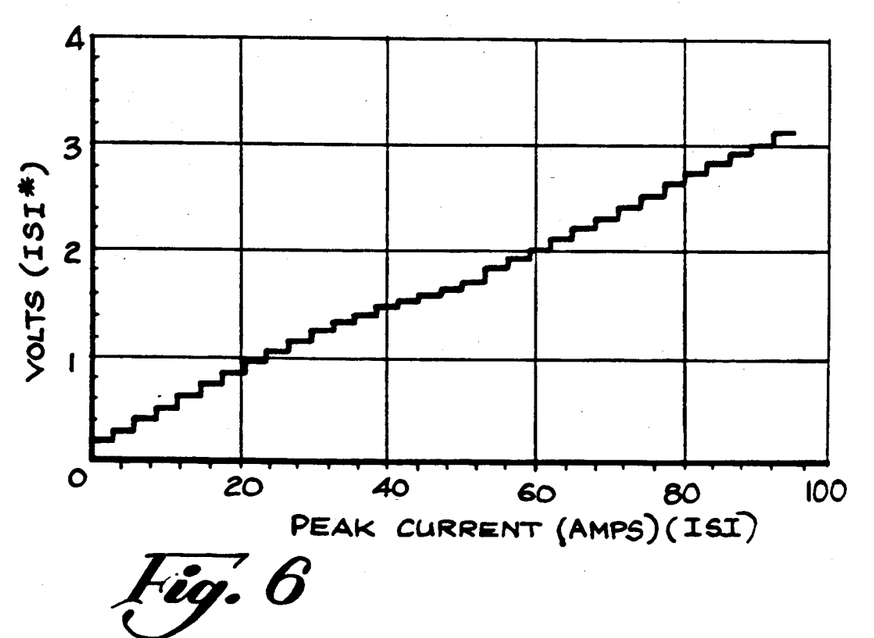
FIG. 6 is a graph showing the adjustment to the current which is sensed (ISI) in the CALC-T2 routine of the program shown in FIGS. 4 and 5.

The CALC-T2 routine commences by reading ISI and BVL. Then, ISI is adjusted to ISI* which provides a value corresponding to the output voltage corresponding to ISI. This voltage depends upon the nature of the load and the impedances presented by the output transformer 56 and the circuitry associated therewith. A table of values relating ISI* to the measured ISI* is stored in ROM. For most resistive loads and for typical power supply loads, the relationship between ISI* and the compensated value ISI corresponding to the output voltage is approximately linear. A typical relationship between ISI* in terms of its peak current which is read just after Q1 is turned on, is shown in FIG. 6.

Figure 7:
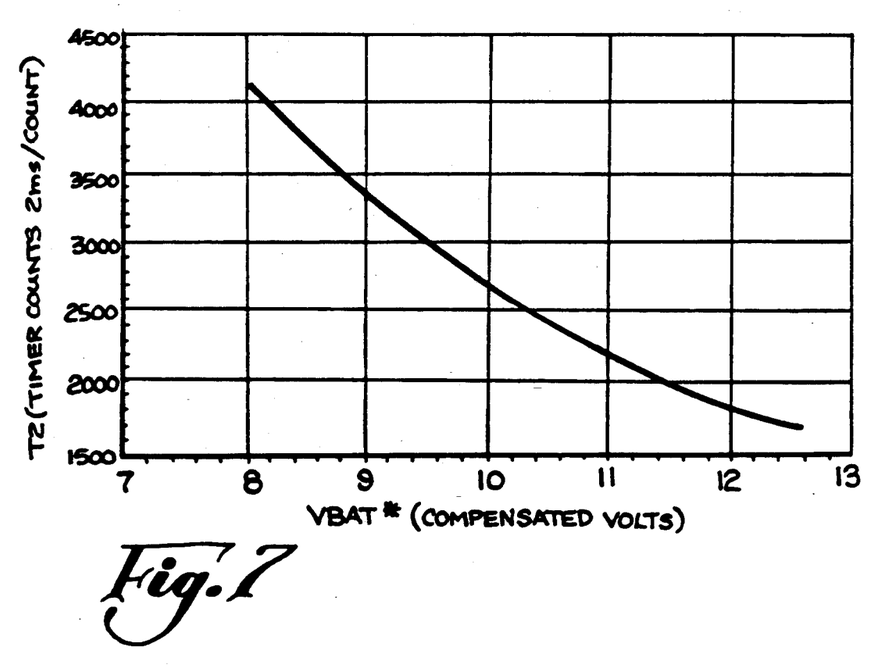
FIG. 7 is a curve illustrating the results of the calculation of the duration of the switching pulses which operate the inverter showing the relationship of the duration of these pulses to the inverter current and battery voltage.

Next, the BVL is included in the calculation. The digital valve corresponding to BVL is acquired with the A/D converter 22 and ISI* is then subtracted from BVL* to create BVL*. The computation is by way of subtraction because the increase in current works in an opposite sense in determining the average AC voltage output from the decrease in BVL. Then, T2 is calculated based on BVL* which is BVL minus ISI*. The calculation carries out a quadratic equation wherein T2 equals $a(BVL^*)^2$ plus $b(BVL^*)$ plus c. This equation is plotted in FIG. 7. Since ISI is included in the BVL* (shown as VBAT* in FIG. 7), it will be seen that the relationship between BVL and T2 is an inverse relationship, T2 increasing as BVL decreases. Typical coefficients for 60 Hz operation are as follows: a=78; b=2140; c=16391 and for 50 Hz operation, a=94, b=2568, and c=19685.

After T2 has been computed, T3 is computed by subtracting the half cycle durations of the AC output wave form from T2. For 50 cycles, T3=10 ms-T2 and for 60 cycles, T3=8.33 ms-T2. Now T3 and T2 have been calculated and are stored in RAM in the CPU 20.

While the timer which has been set with T2 is still running, the CHK-AC routine is executed, (see FIG. 4B) as part of the overall inverter routine, to determine when the AC line has returned and to adjust T3 to allow the inverter to phase lock with the input line signal (ZCD), so that the voltage generated by the inverter will be synchronous with the AC line voltage on transfer. Since a relay 14 is energized by XFR and takes time to switch, an impending transfer counter is used. If the count in that counter is equal to zero, the AC line has not been present for 8.5 seconds. It requires three counts, each of which occurs on a toggle of FOUT, to set the XFR FLG. The expiration of three counts corresponds to a complete cycle (a full period) of the AC output from the inverter. Accordingly, there is a full cycle delay before the transfer flag is set, indicating that the inverter is no longer needed and allowing the program to return to the AC present routine shown in FIG. 3.

If the impending transfer counter is equal to zero, transfer is not pending and the AC line voltage level LVL is read. If LVL is within the threshold (+/−15% of the nominal 120 VAC value) the program proceeds to synchronize the inverter output voltage. If, however, LVL is outside of the threshold range, the return counter is set to zero and the inverter routine proceeds via connectors B—B to complete the generation of the QID drive pulse and to generate the Q2D drive pulse, thereby providing the next half cycle of the inverter output wave form. FIG. 5 shows this final part of the routine and will be discussed below.

If the line voltage is within the threshold range an ACL (AC line) return counter is incremented. The counter is incremented once each half cycle of the output voltage when the line has returned. If the counter has counted up to a predetermined number indicating the the line has returned (is in its unfailed state) for a sufficient time so that it is expected that the line has truly returned (in this case 1020 counts or 510 cycles which is 8.5 seconds at the 60 Hz rate), the CPU generates XFR and causes the relay to pull in, starting switch-over from the inverter output to the AC line. The impending transfer counter is then incremented. It will be recalled that when the counter is incremented three times allowing for another cycle of the AC wave form, the transfer flag is set. However, if the predetermined time or 1020 counts of the return counter have not been accumulated, the program continues to a part of the CHK-AC routine which provides for phase locking of the inverter output voltage to the AC line, which has then returned.

In the latter part of the CHK-AC routine the value of T3 is varied to cause phaselock with the AC line. The quantity T1 minus T2, where T1, is a fixed time of 7.82 microseconds for 60 Hz operation, is computed. There are two possible cases which can occur. When T1 (fd) minus T2 is less than zero, then Q1D and Q2D will have a duty cycle of 50% and T3/2=0. (fd) means fixed delay). If T1 (fd) is greater than T2, Q1D and Q2D have less than a 50% duty cycle and a temporary value of T3/2 is then computed and stored in RAM The value of T3 computed is equal to T1 minus T2 divided by 2. The phase difference error voltage, VCOER, is then read and these temporary values of T3/2 are adjusted by adding thereto the value of VCOER. The adjusted value of T3/2 brings the AC output wave form from the inverter closer into phase lock with the returned AC line. By the time that the 1020 half cycles of the AC line has expired, the inverter output voltage will be in synchronism or substantially in synchronism with the returned AC line. Then, on switchover to the AC line transients and waveform distortion are avoided.

Referring to FIG. 5 it will be seen that the dwell or dead time (T3 in FIG. 2) commences by Q1D being turned off and Q3D turned on, both after the timer times out. The timer times out after T2 expires. Then the timer is set with the adjusted or current value of T3/2. After the time out, T3/2 having expired, F-OUT is toggled. This creates the trailing edge of the first F-OUT pulse (see FIG. 2). The timer is again set with T3/2, and when time out occurs the dwell time is completed. Q3D is then turned off and Q2D is turned on to start the pulse which forms the negative half of the cycle. The next cycle starts by setting the timer to T2, starting the timer, and while the timer is running executing the CAL-T2 and CHK-AC routines. When the timer times out, T2 again having expired, the trailing edge of the pulse which provides the negative half of the AC inverter output is formed. The dwell time for the last part of the cycle is generated by setting the timer with T3/2. When the timer expires F-out is toggled which starts the T1 pulse for the next cycle and completes the first cycle. The program then returns via connectors C—C.

Figure 8A:
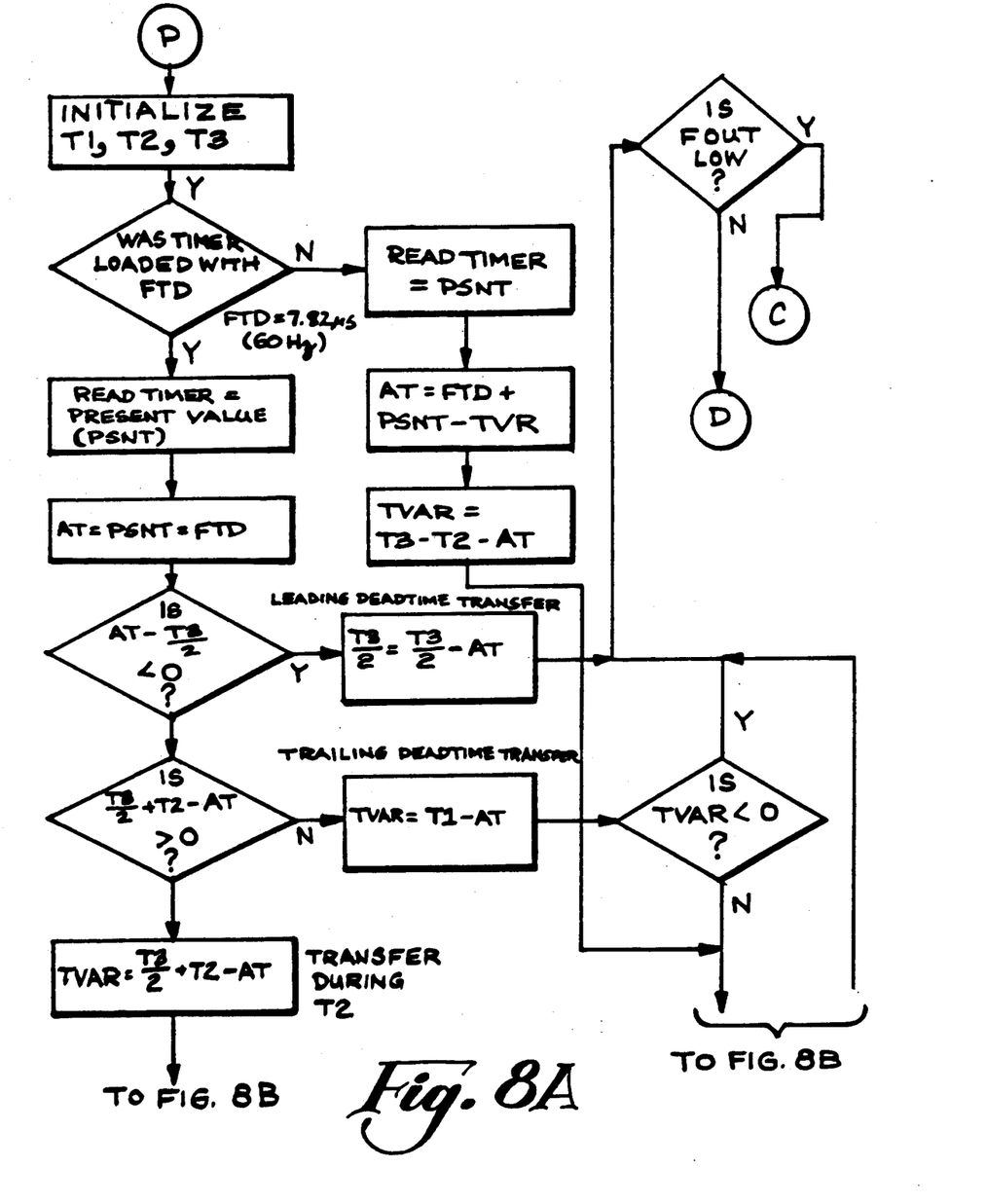
Figure 8B:
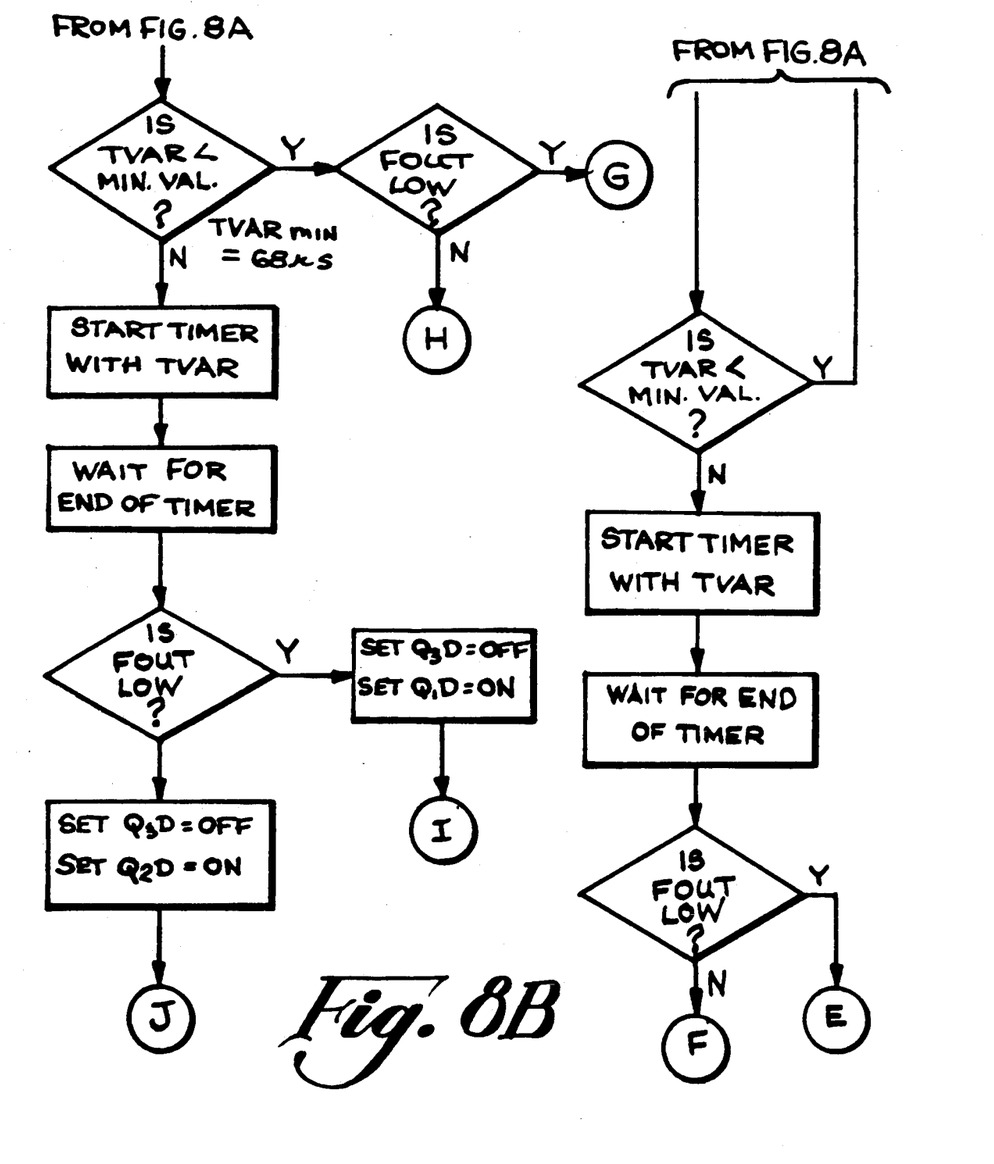

Referring to FIG. 8, the flow chart is shown that decides where the inverter program (FIGS. 4 & 5) should be entered. The entry point depends on where in the AC input voltage waveform the line fail interrup occurred. The inverter routine is started at the points indicated by the connectors C-J. By jumping to the appropriate points, the inverter output voltage will commence substantially in phase with the AC line voltage when it failed.

The line fail detector 28 may be implemented in many different ways. One possible way is to pass the output of the rectifier 26 through a low pass filter with a cutoff frequency (3 dB point) of 7 kHz. The output of this filter is connected to the inverting input of a comparator and a reference voltage with a DC value equal to 0.21 of the peak of the nominal rectified AC voltage connected to the noninverting input. The comparator should have an open collector type of output such that it connects the output to ground or becomes an open circuit. Thus connected, the comparator output will be an open circuit around the zero crossings of the ac line and zero during the peak portions of the ac line.

An 0.01 uF capacitor is discharged by the comparator through a 365K ohm resistor when the comparator output is zero and charges up through a 191K resistor and a diode connected in series to +5 Volts when the comparator output is an open circuit. The voltage across the 0.01 uF capacitor is connected to the inverting input of a second comparator with the noninverting input connected to a dc voltage of 2.5 V. The second comparator output will be low when the input AC line voltage falls below 85% of the nominal input ac voltage or 102 V for a 120 V. line. The second comparator output may be used as the interrupt signal for the microprocessor to inititate inverter operation. The 2.5 Volt input to the second comparator may be varied to change the line dropout threshold level.

From the foregoing description it will be apparent that there has been provided an improved power supply system which is especially suitable for use as a standby power supply. Variations and modifications of the herein-described system, within the scope of the invention, will undoubtedly suggest themselves to those skilled in the art. Accordingly, the foregoing description should be taken as illustrative and not in a limiting sense.

We claim:

1. The method of generating, from a source of DC voltage, AC power of a voltage level corresponding to the voltage from an AC line and in synchronous relationship with the voltage from the AC line so as to provide a standby source of AC power to replace the power from said line when said line is in a failed state where it fails to provide power sufficient to operate a load, said method comprising the steps of inverting said DC voltage to generate an AC voltage comprising a train of input pulses, sensing current corresponding to the amplitude of each of said input pulses, varying the duty cycle of said pulses in response to said current to maintain said voltage level, and varying the time of occurrence of said pulses to provide said synchronous relationship.

2. The method according to claim 1 further comprising the step of sensing the magnitude of said DC voltage and carrying out said varying step also in response to the magnitude of said DC voltage.

3. The method according to claim 2 further comprising the step of generating a repetitive signal having a frequency equal to the frequency of the AC line voltage, and said varying time of occurrence step includes the step of detecting the difference in phase between said pulses and said repetitive signal, and adjusting the timing of said pulses to reduce said difference in phase.

4. The method according to claim 3 further comprising the step of detecting when said AC line voltage level reaches a certain level approaching the level which provides voltage sufficient for operating the load, and commencing carrying out said varying step when said line voltage level reaches said certain level.

5. The method according to claim 4 further comprising the step of connecting said load to receive AC power from said train of pulses when said AC line enters said failed state where said line fails to provide voltage of said certain level, and connecting said AC line to said load a predetermined time after said line leaves said failed state when line voltage level has reached said certain level.

6. The method according to claim 5 wherein said varying step is carried out during said predetermined time.

7. The method according to claim 6 further comprising the seep of discontinuing said inverting step after expiration of said predetermined time.

8. The method according to claim 1 wherein said inverting step is carried out by generating first and second trains of pulses with the pulses in said second train being delayed with respect to the pulses in said first train by intervals of time, and wherein said step of varying the time of occurrence of said pulses to provide said synchronous relationship is carried out by varying said intervals of time.

9. The method according to claim 8 further comprising the step of generating a third train of pulses at the frequency of said AC line which pulses of said third train have leading and trailing edges which respectively occur within successive ones of said intervals.

10. The method according to claim 9 wherein said step of varying said intervals is carried out detecting the difference in phase of said third train and zero crossings of said AC line voltage, and varying said intervals to reduce said difference in phase.

11. The method according to claim 8 wherein said inverting step is carried out by causing current to flow from said DC source in opposite directions through said load respectively upon occurrence of said pulses in said first trains and second trains.

12. The method according to claim 11 further comprising the step of varying the durations of the pulses in said first and second trains to control the voltage level of said AC voltage.

13. The method according to claim 12 wherein said duty cycle varying step is carried out by sensing the magnitude of said current and varying said durations of said pulses in said first and second trains in relationship with the magnitude of said current.

14. The method according to claim 13 wherein said relationship is an inverse relationship.

15. The method according to calim 14 wherein said duty cycle varying step further comprises the step of sensing the magnitude of the DC voltage from said source, and said step of varying the durations of said pulses of said first and second trains is carried out in response to the magnitude of said voltage and of said current.

16. The method according to claim 15 wherein said step of varying the durations of said pulses of said first and second trains comprises the steps of adjusting the magnitude of the current which is sensed to correspond to the voltage across said load, summing the magnitude of the DC voltage which is sensed and the adjusted magnitude of the current, and varying the durations to be equal to a $(BVL^*)^2 + b(BVL^*) + c$ where a, b, and c are numerical values and BVL* is the sum of the magnitude of the DC voltage which is sensed and the adjusted magnitude of the current.

17. The method according to claim 1 further comprising the step of generating a pulse train in synchronism with the zero crossings of said AC line voltage when said AC line is not in a failed state.

18. The method according to claim 17 further comprising the step of switching the load from said AC line to receive said AC voltage generated on said inverting step when said line enters the failed state.

19. The method according to claim 18 further comprising the step of synchronizing said pulse train generated during said inverting step with said AC line voltage when said line leaves the failed state.

20. A system for generating AC power of a voltage level corresponding to the voltage from an AC line and in synchronous relationship with the voltage from the AC line so as to provide a standby source of AC voltage to replace the voltage from said line when the power is in a failed state where it fails to provide voltage sufficient to operate a load, said system comprising a source of DC voltage, means for inverting said DC voltage to generate an AC voltage comprising a train of pulses, means in said inverting means for sensing input current corresponding to said AC voltage, means for varying the duty cycle of said pulses in response to said input current to regulate said voltage level, and means responsive to said voltage from said AC line after said voltage has returned from said failed state for varying the time of occurrence of said pulses to provide said synchronous relationship.

21. The system according to claim 20 further comprising means for sensing the magnitude of said DC voltage, and said varying means including means for varying said time of occurrence in response to the magnitude of said DC voltage as well as in response to the magnitude of said current.

22. The system according to claim 21 further comprising means for generating a repetitive signal having a frequency equal to the frequency of the AC line voltage, and said means for varying time of occurrence also includes means for detecting the difference in phase between said pulses and said repetitive signal, and means for adjusting the timing of said pulses to reduce said difference in phase.

23. The system according to claim 22 further comprising means for detecting when said AC line voltage level reaches a certain level approaching the level which provides voltage sufficient for operating the load, and means for operating said varying means when said line voltage level reaches said certain level.

24. The system according to claim 23 further comprising means for connecting said load to receive AC power from said train of pulses when said AC line enters said failed state, and means for connecting said AC line to said load a predetermined time after said line leaves said failed state by having reached said certain level.

25. The system according to claim 24 wherein said varying means is operative only during said predetermined time.

26. The system according to claim 25 further comprising means for terminating operation of said inverting means after expiration of said predetermined time.

27. The system according to claim 20 wherein said inverting means comprises means for generating first and second trains of pulses with the pulses in said second train being delayed with respect to the pulses in said first train by intervals of time, and wherein said means for varying the time of occurrence of said pulses to provide said synchronous relationship includes means for varying said intervals of time.

28. The system according to claim 27 further comprising means for generating a third train of pulses at the frequency of said AC line which pulses of said third train have leading and trailing edges which respectively occur between successive ones of said intervals.

29. The system according to claim 28 wherein said means for varying said intervals comprises means for detecting the difference in phase of said third train and zero crossings of said AC line voltage, and means for varying said intervals to reduce said difference in phase.

30. The system according to claim 27 wherein said inverting means comprises a transformer having a primary winding and a secondary winding which provides said AC voltage from said inverting means, means for causing current to flow from said DC source in opposite directions through said primary winding respectively upon occurrence of said pulses in said first train and second train.

31. The system according to claim 30 further comprising means for varying the durations of the pulses in said first and second trains to regulate the voltage level of said AC voltage from said inverting means.

32. The system according to claim 31 wherein said duty cycle varying means includes means for sensing the magnitude of said current and means for varying said durations of said pulses in said first and second trains in relationship with the magnitude of said current.

33. The system according to claim 32 wherein said relationship is an inverse relationship.

34. The system according to claim 32 wherein said duty cycle varying means further comprises means for sensing the magnitude of the DC voltage from said source, and said means for varying the durations of said pulses of said first and second trains includes means responsive to the magnitude of said voltage and of said current.

35. The system according to claim 34 wherein said means for varying the durations of said pulses of said first and second trains comprises means for adjusting the magnitude of the current which is sensed to correspond to the voltage across said load, means for summing the magnitude of the DC voltage which is sensed and the adjusted magnitude of the current, and means for varying the durations to be equal to a $(BVL^*)^2 + B(BVL^*) + C$ where a, b, and c are numerical values and $BVL^*$ is the sum of the magnitude of the DC voltage which is sensed and the adjusted magnitude of the current.

36. The system according to claim 20 further comprising means for generating a pulse train in synchronism with the zero crossings of said AC line voltage when said AC line is not in a failed state.

37. The system according to claim 36 further comprising means for switching the load from said AC line to receive said AC voltage generated by said inverting means where said line enters the failed state.

38. The system according to claim 37 further comprising means for synchronizing said pulse train generated during said inverting step with said AC line voltage when said line leaves the failed state.

39. The system according to claim 20 wherein said duty cycle varying means and said time of occurrence varying means are provided by a computer.

* * * * *